US007057548B1

(12) United States Patent
Roberts

(10) Patent No.: US 7,057,548 B1
(45) Date of Patent: Jun. 6, 2006

(54) AUTOMATIC DATA CAPTURE TECHNOLOGY TO ENHANCE DATA COLLECTION

(75) Inventor: Roger L. Roberts, Amesbury, MA (US)

(73) Assignee: Geophysical Survey Systems, Inc., North Salem, NH (US)

( * ) Notice: Subject to any disclaimer, the term of this patent is extended or adjusted under 35 U.S.C. 154(b) by 0 days.

(21) Appl. No.: 10/678,702

(22) Filed: Oct. 3, 2003

(51) Int. Cl.
*G01S 13/88* (2006.01)

(52) U.S. Cl. .............................. 342/22; 342/27; 342/52; 342/54

(58) Field of Classification Search ................. 342/22, 342/27, 52, 54, 179, 190, 192, 450, 452, 342/459, 463; 436/147, 173; 336/232; 324/242, 324/243, 326, 345; 340/870.32
See application file for complete search history.

(56) References Cited

U.S. PATENT DOCUMENTS

| 6,144,206 | A  | * | 11/2000 | Goldfine et al. ............ 324/345 |
| 6,876,308 | B1 | * | 4/2005 | Ghahramani .............. 340/815.4 |
| 2003/0112170 | A1 | * | 6/2003 | Doerksen et al. ............. 342/22 |
| 2004/0157342 | A1 | * | 8/2004 | Lovell et al. ................ 436/173 |

FOREIGN PATENT DOCUMENTS

CA            2234597 A1 * 10/1999

OTHER PUBLICATIONS

A new bistatic GPR system using a passive optical sensor for landmine detection, Sato, M., Advanced Ground Penetrating Radar, 2003. Proceedings of the 2nd International Workshop on May 14-16, 2003 pp.: 164-167.*
"Bistatic GPR system for landmine detection using optical electric field", Sato, M.Antennas and Propagation Society International Symposium, 2003. IEEE vol. 2, Jun. 22-27, 2003 pp.: 207-210 vol. 2.*

* cited by examiner

*Primary Examiner*—John B. Sotomayor
(74) *Attorney, Agent, or Firm*—Wolf, Greenfield & Sacks, P.C.

(57) ABSTRACT

Method, apparatus and system for determining accurately at least one coordinate of a sensor (or a transducer including a sensor) relative to a predetermined reference location, particularly where the sensor is part of a transducer for ground penetrating radar. A marker detector is positioned in a predetermined relationship with the sensor; a marker is detected with the marker detector and positional information associated with the marker is received, from which a position of the transducer or sensor is determined, based on the received positional information associated with the marker and the predetermined relationship between the marker detector and the sensor. The marker may, for example, be a bar code and the marker detector may be an optical scanner. The sensor may be a receiving antenna for a GPR signal.

11 Claims, 4 Drawing Sheets

AUTOMATIC DATA CAPTURE TECHNOLOGY TO ENHANCE DATA COLLECTION

BACKGROUND

1. Field of the Invention

The present invention is directed toward a method, apparatus and system for determining accurately the coordinates of a sensor (or a transducer including a sensor) relative to a predetermined reference location, particularly where the sensor is part of a transducer for ground penetrating radar.

2. Discussion of Related Art

Ground penetrating radar ("GPR") systems are used to obtain measurements of subsurface structures and provide images of the internal structure of opaque materials such as soil, rock, concrete, asphalt and wood.

Most GPR equipment utilizes time-domain methods to penetrate a medium. This typically entails generation and radiation of short electromagnetic pulses with center frequencies in a range of about 10 megahertz (MHz) to 2 gigahertz (GHz). The radiated pulses propagate from a system's radar transmitter and transmitting antenna, penetrate the subsurface medium and reflect, refract, and/or diffract at boundaries of intrinsic impedance contrasts, commonly referred to as targets, in the subsurface medium. A portion of the redirected energy propagates back to a receiving antenna (which serves as a sensor), from which the energy may be detected, processed, displayed and stored. In this manner, a time-versus-distance map of a series of measurements over the medium surface can be obtained and used to construct a cross-sectional image of targets within the medium.

A less common GPR technique utilizes stepped continuous-wave technology, which entails the radiation of short pulses at different frequencies. Another rarely used GPR technique employs a continuously radiated pulse swept over a range of frequencies. The data obtained using both these methods can be converted into an equivalent time-distance map as that produced by time-domain GPR systems by using an inverse Fourier transform performed on each scan.

Data is often collected along a series of parallel profile lines to yield a 3-D image of reflectors (targets) in the subsurface medium. The quality of the 3-D image is directly correlated to the accuracy of the coordinates of the parallel profile lines. A conventional method for collecting data along parallel profile lines and demarcating the starting and ending (x,y) coordinates of each profile line is to position the transducer on a grid and move the transducer along each line on the grid. Often, the starting point of each parallel line is indicated by a user-generated mark in the data or by separating the data from each profile line into separate data files. Both methods rely on the user to position the transducer accurately on the starting point of each profile line and to record the (x,y) coordinates of the starting point of each line and the direction of the profile line.

Generally it may be desired that the transducer will traverse along a straight line so that the ending y-coordinate is the same as the starting y-coordinate (assuming travel in the x-direction). However, this is not always the case, particularly if the area being surveyed is large and there is thus a large distance between the beginning and end of a line. A distance encoder, such as a meter wheel, may be used to record the distance the transducer has traveled and the length of a profile line. If the surface of the area being surveyed is uneven, the wheel may (and often will) skip, thus introducing errors into the distance measurement. In applications where centimeter-level accuracy in the position of the transducer is important, such errors in the distance measurement may be unacceptable. Also, it is often undesirable to rely on the operator to position the transducer accurately, and to record these positions since there is a likelihood of operator error, particularly when a very high level of positioning accuracy is required; and in any event, such efforts increase the time involved to successfully collect the data.

There is thus an established need to improve the accuracy and efficiency of registering the (x,y) coordinates of scans of GPR data. Geophysical Survey Systems, Inc. (GSSI) of North Salem, N.H., USA, has previously developed a positioning method that employs the characteristics of a metal strip reflection in GPR data to accurately position one of the coordinates of GPR scans, either the x- or the y-coordinate depending on the orientation of the profile line (U.S. patent application Ser. No. 09/988,570). This method requires that the reflection from the metal strip be recognized in the GPR data, which may pose problems for certain transducer models and antenna orientations relative to the profile line direction.

Accordingly, there is a need for a method for determining the position of a GPR transducer that is not sensitive to GPR transducer characteristics. It may be desirable that such a method be efficient to employ and utilize an apparatus that is inexpensive and simple to deploy and use.

SUMMARY OF THE INVENTION

The foregoing and other needs and objectives are satisfied by means of employing a new method and an apparatus and system for, inter alia, carrying out the method, for determining accurately the coordinates of a sensor (or a transducer including a sensor) relative to a predetermined reference location.

According to a first aspect, there is shown a method for determining a current coordinate (or the current coordinates) of a movable sensor (such as, but not limited to, a GPR sensor), which method comprises positioning a marker detector in a predetermined relationship with the sensor; detecting a marker with the marker detector; receiving positional information associated with the marker; and determining a position of the transducer based on the received positional information associated with the marker and the predetermined relationship between the marker detector and the sensor. The marker may, for example, be a bar code and the marker detector may be an optical scanner. The sensor may be a receiving antenna for a GPR signal. In some aspects or embodiments, the method also may include the step of deploying a plurality of markers, and encoding each marker with its associated positional information.

According to a second aspect, there is shown an apparatus for use with a plurality of markers associated with positional information determining a current coordinate(s) of a movable sensor. Such apparatus may comprise a marker detector that transmits a marker detection signal when in close proximity to a marker, and a control unit coupled to the marker detector and to the sensor. The positional information associated with a marker is provided to the control unit in response to the marker detection signal and the control unit determines a coordinate(s) of the sensor based on said positional information and on a predetermined location of the marker detector relative to the sensor. Such apparatus may further comprise, in some aspects or embodiments, a movable platform upon which the marker detector and the sensor are located. A marker may include a bar code and the marker detector correspondingly may be a bar code scanner.

According to a third aspect, there is shown and described herein a system comprising: an apparatus for use with a plurality of markers associated with positional information determining a current coordinate(s) of a movable sensor, said apparatus having a marker detector that transmits a marker detection signal when in close proximity to a marker, a control unit coupled to the marker detector and to the sensor, and a movable platform upon which the marker detector and the sensor are located; the positional information associated with a marker is provided to the control unit in response to the marker detection signal and the control unit determines a coordinate(s) of the sensor based on said positional information and on a predetermined location of the marker detector relative to the sensor; a grid; and the plurality of markers being located at predetermined locations on the grid. Optionally, an additional marker is placed on the grid and can be read by the sensor to provide additional information such as the grid size and/or the arrangement of the plurality of markers on the grid.

According to yet another aspect, there is shown a further system comprising: an apparatus for use with a plurality of markers associated with positional information determining a current coordinate(s) of a movable sensor, said apparatus having a marker detector that transmits a marker detection signal when in close proximity to a marker, a control unit coupled to the marker detector and to the sensor, and a movable platform upon which the marker detector and the sensor are located; the positional information associated with a marker is provided to the control unit in response to the marker detection signal and the control unit determines a coordinate(s) of the sensor based on said positional information and on a predetermined location of the marker detector relative to the sensor; a ribbon; and the plurality of markers are located at intervals along said ribbon. Optionally, an additional marker is placed on the ribbon and can be read by the sensor to provide additional information such as the ribbon length and/or the arrangement of the plurality of markers on the ribbon.

BRIEF DESCRIPTION OF THE DRAWINGS

The foregoing and other features and advantages of the present invention will be apparent from the following non-limiting discussion of various illustrative embodiments and aspects thereof with reference to the accompanying figures. It is to be appreciated that the figures are provided as examples for the purposes of illustration and explanation and are not intended as a definition of the limits of the invention. In the figures, in which like elements are represented by like reference numerals.

DETAILED DESCRIPTION

Figure 1:
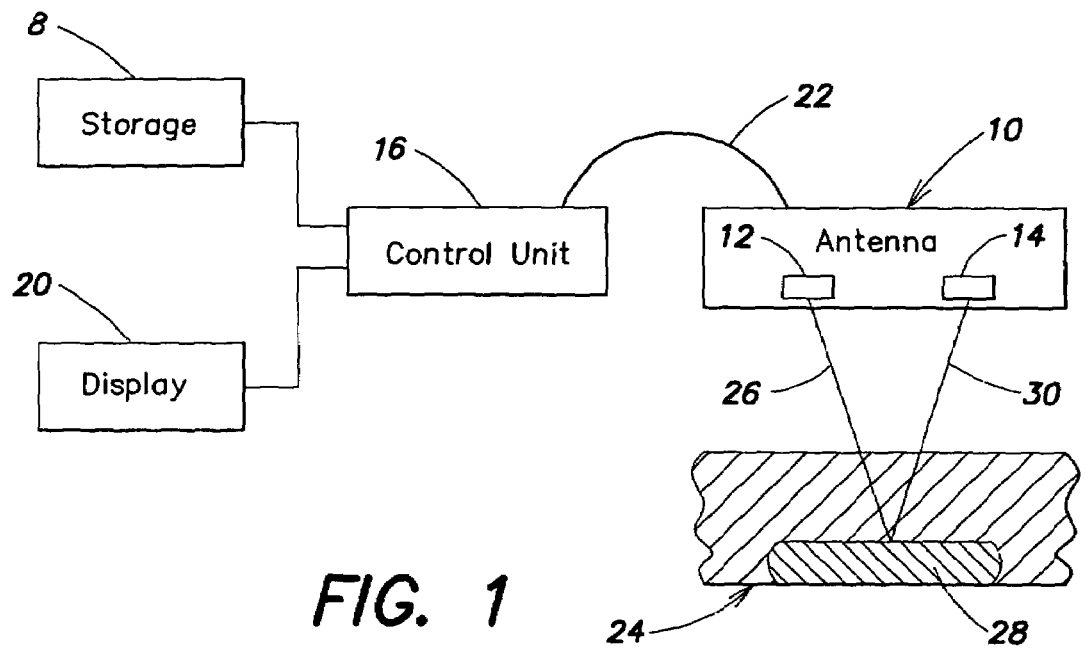
FIG. 1 is a schematic block diagram of a conventional GPR system with which the invention may be used.

Various illustrative embodiments and examples of the present invention and aspects thereof will now be described in more detail with reference to the accompanying figures. It is to be understood that the invention is not limited in its application to the details of construction and the arrangement of components set forth in the following description or illustrated in the drawings. Other applications, details of construction, arrangement of components, embodiments and aspects of the invention are possible. Also, it is further to be understood that the phraseology and terminology used herein is for the purpose of description and should not be regarded as limiting. In addition, the use of "including," "comprising," or "having" and variations thereof is meant to be open-ended, not closed—i.e., to encompass the items listed thereafter and equivalents thereof as well as allowing for the presence or inclusion of additional items, though additional items or elements are not required.

Referring to FIG. 1, there is illustrated a typical ground penetrating radar (GPR) system. The illustrated system comprises a transducer 10 including a transmitting antenna 12 and a receiving antenna 14. The transducer 10 is coupled to a control unit 16 which may send control signals, including a transmitter trigger pulse, to the transducer and receive signals from the transducer. Control unit 16 may be coupled to a storage device 18 and a display device 20. It is to be appreciated that while control unit 16, storage device 18 and display device 20 are illustrated as discrete units in this example, they may be provided as a single integrated element, such as, for example, a personal computer, or in some other arrangement.

The control unit 16 generates a signal, typically a pulse signal, which is transported to the transducer module via, for example, a cable 22. The signal 26 may be transmitted by transmitting antenna 12 and penetrates a medium 24 where it may be reflected by a subsurface target 28. Target 28 may be any object that has an intrinsic impedance different from that of the surrounding medium and which thus causes at least a partial reflection of a signal propagating through the medium 24. Some examples of targets include: a metal object, a pipe, a body of water, and the like. The reflected signal 30 propagates back from target 28, through medium 24, and may be received by receiving antenna 14. Control unit 16 may receive the reflected signal 30 from transducer 10 via, for example, cable 22, and may store (using storage device 18) and/or display (using display device 20) information derived from the reflected signal 30 or characteristics of the reflected signal 30, such as, for example, amplitude, time duration, center frequency, or frequency distribution of the reflected signal. Control unit 16 may derive information about target 28 from measured characteristics of reflected signal 30.

In many applications, it may be desirable to know the position of transmitting antenna 12 and/or receiving antenna 14 accurately. In some uses, accurate absolute position is needed. In other uses, it is sufficient, or sometimes more important, that an accurate relative position be achieved. For example, when a three-dimensional image of subsurface conditions is to be assembled from multiple, parallel traverses of a plot by the antenna module, it is required that locations along the scan lines be positionally correlated from line to line, and not offset in a forward or backward direction. In such situations, it suffices that the antenna module location be known relative to a known reference location so that, in turn, the location of target 28 may be determined accurately with respect to the reference location. We thus provide a method and apparatus for accurately determining a coordinate(s) of an antenna relative to a fixed reference.

Figure 2:
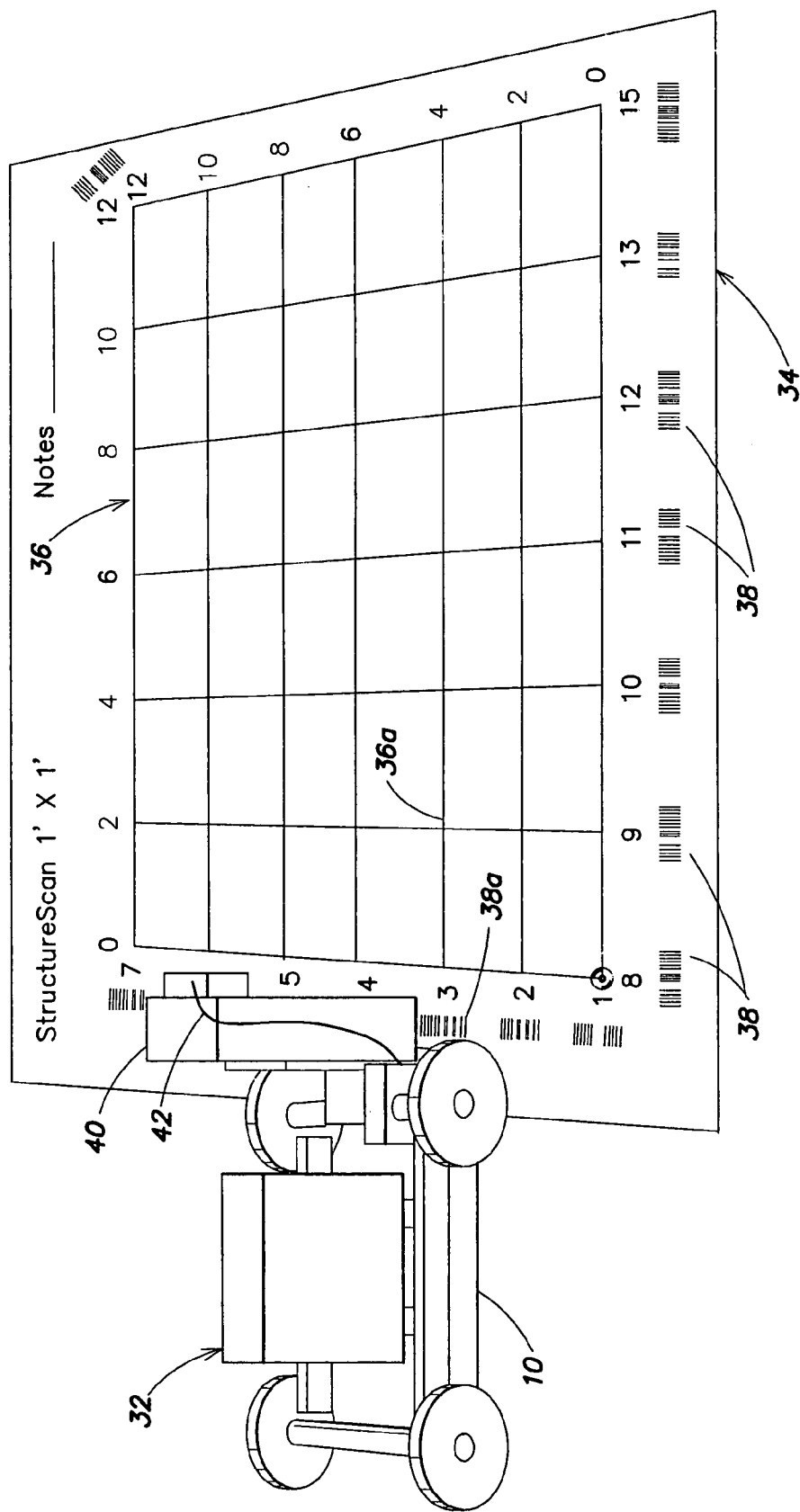
FIG. 2 is an illustration of a GPR data collection and positioning system according to the invention.

Referring to FIG. 2, there is illustrated one embodiment of a GPR apparatus according to the invention. The transducer 10 is mounted on a movable structure, for example, a cart 32.

A grid 34 may be used to demarcate profile lines for collecting data over an area, to establish a positional reference for a data collection and imaging system. The transducer 10 may be moved over the grid 34 (by moving the cart 32) along the grid lines 36, each single traversal of the grid by the transducer 10 corresponding to a single profile line of the data. The transducer 10 may be moved both horizontally and vertically across the grid to provide data from which there may be created a three-dimensional image of the underlying surface. Typically, the profile lines may be approximately parallel, but may run in any direction across the area.

According to one embodiment, a plurality of markers 38 may be placed at various locations on the grid 34, for example along the edges of the grid 34 at the beginning/end of each grid line 36, as illustrated in FIG. 2. An optical sensor 40 may be mounted on the cart 32 and may be coupled to the control unit 16 (which may also be mounted on the cart 32) via, for example, a cable 42. Of course, it is to be appreciated that many other configurations of the components of the GPR system may be used, and the invention is not limited to the particular arrangement illustrated. For example, the control unit may not be disposed on the cart 32 and may instead be located remote from the transducer and may be coupled to the optical sensor 40 and to the transducer 10 via a wireless link (not illustrated), optical link or cable. In one example, the optical sensor 40 may be a bar code reader and the plurality of markers 38 may be printed bar codes. However, it is to be appreciated that the invention is not so limited and numerous other types of optical or other sensors and markers may be used. For example, the markers may include passive optical patterns that are not bar codes, or active optical patterns from light emitting diodes, and the like. Furthermore, in another example, the markers may be active devices, such as radio frequency (RF) transponder tags, and the optical sensor 40 may be replaced with a suitable RF detector. Therefore, although the following discussion will refer primarily to the markers 38 being bar codes and the optical sensor 40 being a bar code reader, it is to be understood that the alternatives discussed above, and equivalents, are intended to be covered as well.

Figure 3:
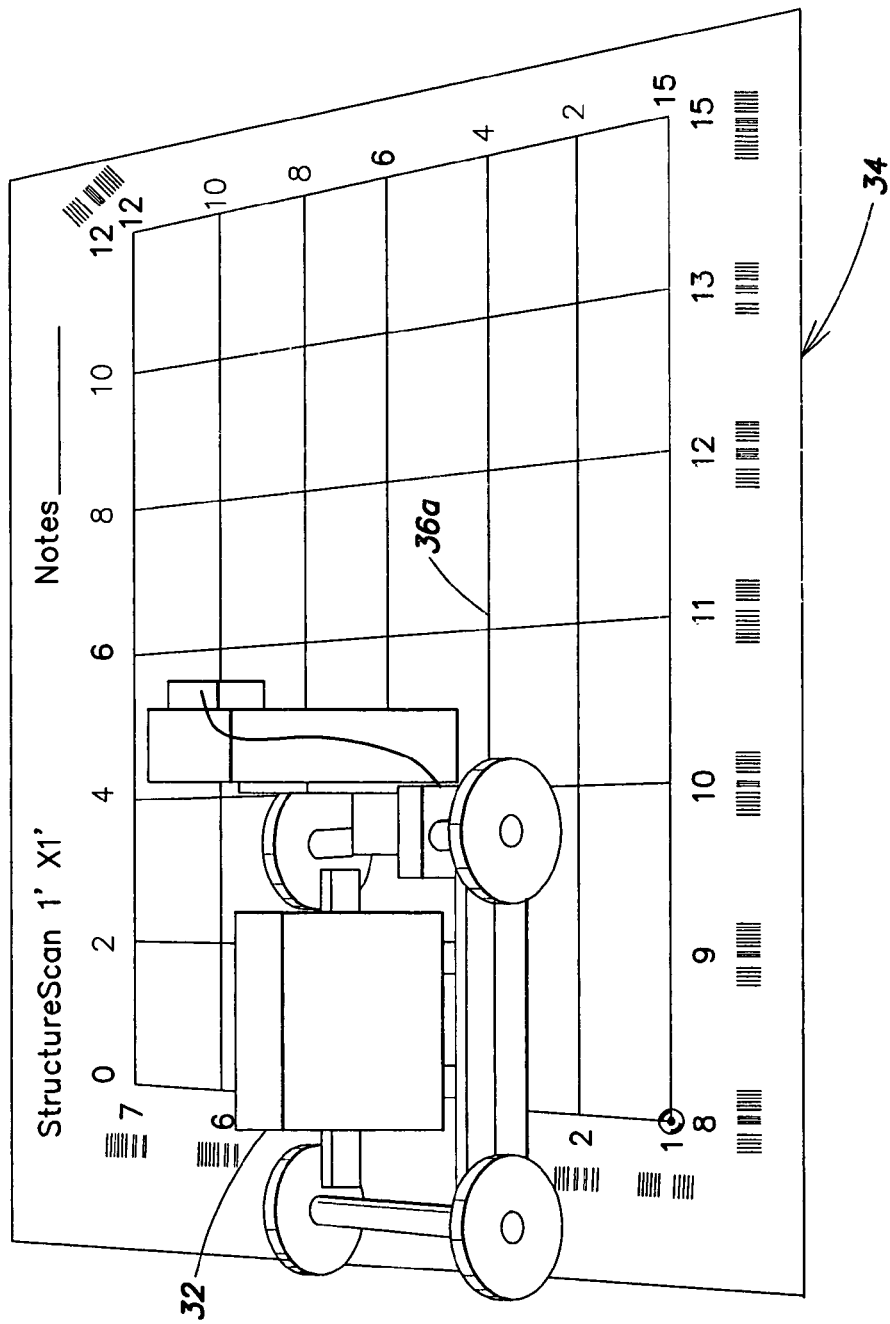
FIG. 3 is another illustration of a GPR data collection apparatus.

Referring again to FIG. 2, the bar code reader 40 may be positioned over a bar code 38a printed on the grid 34 at the start of a profile line 36a. During data collection, a user moves the cart 32 along each profile line 36a, as illustrated in FIG. 3. The cart may be moved in the x or y directions over the grid 34. The cart may be moved manually as, for example, by being towed by a person or animal (e.g., a horse), or the cart may be a motorized vehicle. A distance along a data collection path (profile line) of any particular data point may be determined by recording a starting point (e.g. indicated by the bar code 38a read by the bar code reader 40) and determining the distance traveled along the path by the cart 32, and thus the transducer 10. For example, a distance encoder (not illustrated) may be mounted on the cart 32, or attached to the cart 32, and coupled to the control unit 16 to measure the distance traveled by the cart 32. The control unit may utilize distance information received from the distance encoder to collect scans of data at evenly spaced distance increments. For example, the control unit 16 may receive an indication from the distance encoder that the cart 32 has moved by a certain amount. The control unit, upon receipt of this indication, may send a signal to the transmitting antenna 12 to cause the transmitting antenna 12 to transmit the pulse 26 (see FIG. 1). Typically a number of profile lines of data are obtained in the x-direction (i.e., parallel profile lines) at evenly spaced intervals, and then a same number of lines of data are obtained along the y-direction with the same interval spacing. According to another embodiment, the bar code reader 40 may continuously scan for bar codes 38 and, upon successfully reading a bar code, may send the bar code information to the control unit 16, whereupon the control unit may initiate collection of data. In this manner the bar codes 38 may be used to trigger the start of data collection for each parallel profile line. The distance encoder may include any suitable mechanism, such as, for example, a meter wheel, shaft encoder, optical distance measurer, or any other positioning system.

According to one embodiment, the bar codes (or other optical markers) may be encoded with information, such as, for example, position and/or numbering information, such that scanning of the bar code allows the control unit to access the encoded information. For example, the bar codes may be encoded with their positions on the grid relative to a particular starting point on the grid or to one another. Alternatively, the bar codes may be encoded with predetermined GPS positional information to provide their absolute locations. Bar codes are a convenient choice for the type of marker used because they may be easy and cost-effective to produce and encode with information. Bar codes may also be sufficient small that their being correctly read by the optical scanner provides a very accurate position of the optical scanner and thus the transducer. However, it is to be understood that the invention is not limited to bar codes, and any marker that may provide similar or other benefits may be used.

Figure 4:
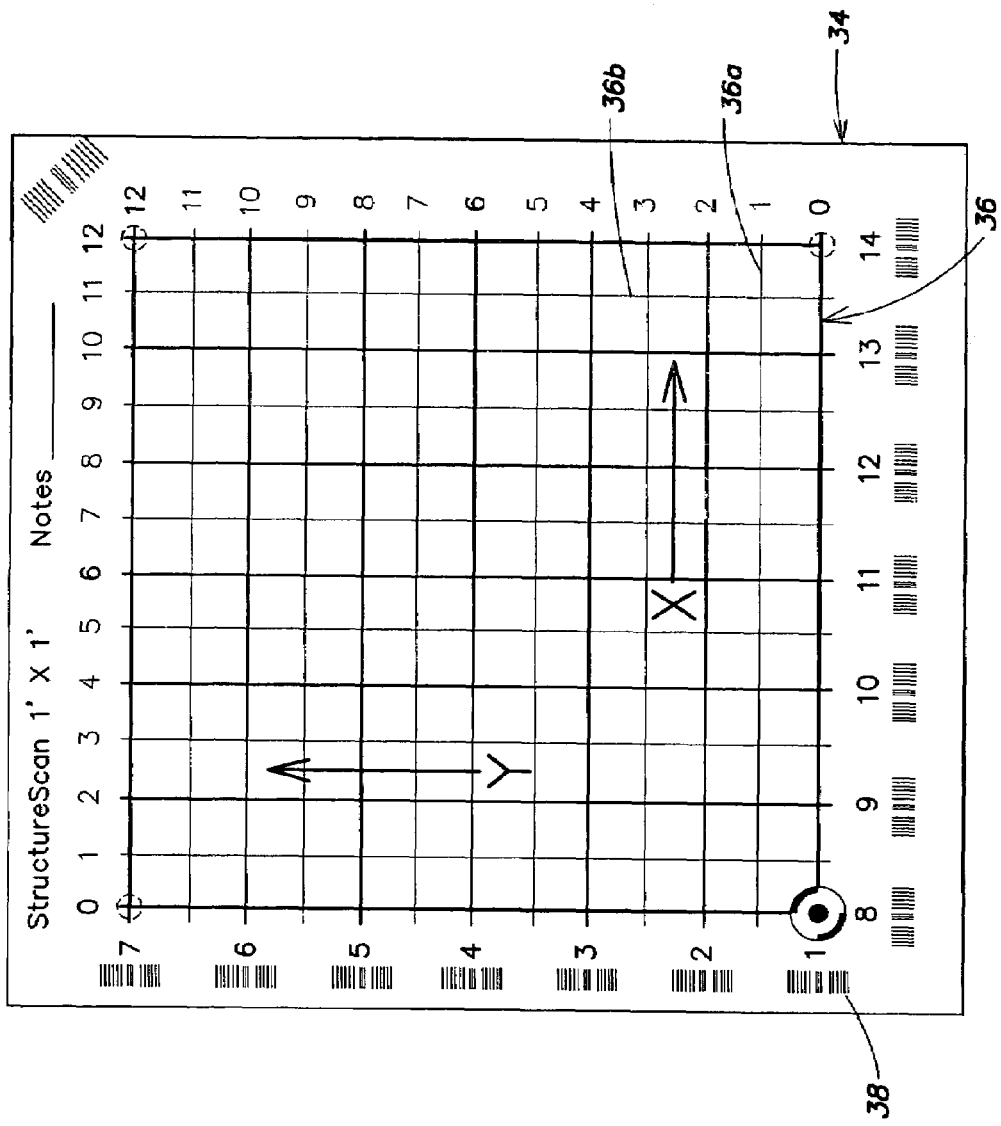
FIG. 4 is a top view of one example of a grid used for data collection.

FIG. 4 illustrates one embodiment of a grid 34 according to the invention. In the illustrated example, the grid 34 comprises a flat, approximately square sheet having several crossing lines 36a, 36b, etc. printed thereon, and bar codes 38 positioned at the start of each line. In this example, the transducer 10 would be moved over each of the lines 36 in turn to provide a total of 7 scanned profiles in the x-direction and 7 scanned profiles in the y-direction, which would be used to construct the subsurface image. Of course, it is to be appreciated that the grid may comprise any number of profile lines 36, as desired, and is not limited to only 7 lines in each of the x and y dimensions. The grid 34 may be printed on, for example, a sheet of paper or plastic, or plastic film, and the like. In addition, the grid may not be square, but may instead be rectangular, trapezoidal, or another shape suitable for the surface being surveyed.

In one example, the grid may be many meters in size (in either or both length or width) and may be used to survey large areas of land or large structures, such as bridges. In this example, there may be additional markers 38 provided at intermediate points along the grid between the start and end of a profile line.

According to another embodiment, where a large surface area may be surveyed, the markers 38 (bar codes) may be placed at regular intervals on long ribbons of material, the material perhaps being similar in appearance to a cloth tape measure, instead of on a sheet of material. In one example, a ribbon may be laid out at the beginning of each profile line where data is to be collected. Also, there may be additional ribbons containing bar codes provided at intermediate points along the grid between the start and end of a profile line. Having one or more intermediate bar codes along a profile line may be particularly advantageous when a large area is being surveyed. There may be a need to maintain the parallelism of the bar codes over the large area, thus it may be useful to combine the ribbons containing the bar codes with, for example, an optical positioning device or system, as discussed in more detail below. Alternatively, the grid may be formed by placing a plurality of ribbons, each comprising a plurality of bar codes, in parallel lines along the area to be surveyed. In this case, an operator may move the cart 32 along each ribbon, corresponding to each profile line, thereby obtaining parallel profile lines of data. The bar codes may be used to indicate the cart's (transducer's) position along a ribbon.

In one embodiment, a secondary positioning system, such as, for example, optical beacons or a GPS system may be used to facilitate laying the ribbons in straight lines across the area to be surveyed. For example, an optical device or system may be used in combination with or instead of the markers 38 to establish the position of the transducer 10, and/or to maintain an approximately straight collection path. In another example, one or more laser beacons may be placed at predetermined locations, either within or without an area to be surveyed. Suitable detectors may be provided on the cart 32. Using optical triangulation, time differences, etc., the position of the cart 32, and thus the transducer 10, may be computed using signals received from the beacons. Of course, it may be necessary that the transducer 10 position be ascertainable to within centimeter-level resolution if accurate subsurface (including near-surface) mapping and modeling are to be done. Based solely on time and related constraints discussed herein, a transducer coordinate determination module may utilize the markers 38, a laser or other optical surveying mechanism, some combination thereof, or some other mechanism serving the same purpose.

For example, the optical system may include optical sensors (not illustrated) located on the transducer cart. The optical sensors may detect changes in the optical characteristics of the surface being surveyed, which may allow the control unit to determine the location of the transducer. A grid, for example, the grid 34 or one or more of the ribbons discussed above, may be laid over the surface being surveyed, and the optical sensors may be used to detect the grid lines 36. The control unit may use information received from the optical sensors, which detect the grid lines, to determine whether the cart is traveling in an approximately straight line. Also, provided that the location of the transducer 10 relative to the optical sensors is known, the control unit may determined the position of the transducer 10 based on signals received from the optical sensors as they pass over the grid lines 36.

According to another example, the antenna coordinate determination module may include a magnetic sensing assembly that may be used in combination with a grid. For example, the magnetic sensing assembly may include magnetic sensors 70 (such as Hall-effect devices) located proximate the transducer on the cart, and magnetic strips, or some other magnetic device placed at, for example, the boundaries of the area to be surveyed. Any of the optical and/or magnetic sensing assembly embodiments described above may be used in conjunction with the markers as secondary or complementary positioning systems.

According to yet another example, the relative positions of marker and scanner may be reversed, though this does add complexity. On the cart, the optical scanner may be replaced with a light source, such as one or more LED's. On the ribbons may be mounted photodetectors which will detect the signals from the light source when the cart rolls over them. The detected signals may be relayed to control unit via wired, wireless or optical channel(s). Positional information of the photodetectors may be encoded in the LED signals or the LED positions may be stored in a look-up table, to name just two possibilities.

The foregoing description directed toward particular embodiments and aspects thereof, is intended for purposes of illustration and explanation. It is to be appreciated that the invention is not limited to the specific examples described herein and the principles may be applied to a wide variety of GPR systems and areas to be surveyed. Various modifications and alterations may be apparent to one of skill in the art and are intended to be covered by this disclosure. For example, the coordinates of the transducer are described above in terms of (x,y) Cartesian coordinates. However, this is merely one example, and the apparatus and methods disclosed herein may be used to determine coordinates of a transducer using any coordinate system as desired, and are not limited to Cartesian systems. In addition, although the above description refers primarily to bar codes, the markers may be any suitable active or passive device that can be encoded with position information. Further, the techniques described herein are not limited in their utility to GPR, or even to radar. These techniques may be used in other sensing environments, such as those that use ultrasound technology for non-destructive testing, where there is a similar need to correlate a sensed signal with the location of the sensor at the time of sensing. The scope of the invention should therefore be determined from proper construction of the appended claims and their equivalents.

What is claimed is:

1. A method for determining at least one current coordinate of a movable sensor comprising:

positioning a marker detector in a predetermined relationship with the sensor;

detecting a marker with the marker detector;

receiving positional information associated with the marker; and determining a position of the sensor based on the received positional information associated with the marker and the predetermined relationship between the marker detector and the sensor.

2. The method of claim 1 wherein the marker is a bar code and the marker detector is an optical scanner.

3. The method of claim 2 wherein the sensor is a receiving antenna for a GPR signal.

4. The method of claim 1 further including the step of deploying a plurality of markers, and encoding each marker with its associated positional information.

5. An apparatus for determining at least one current coordinate of a movable sensor, said apparatus intended to be used with a plurality of markers associated with positional information and comprising:

a marker detector that transmits a marker detection signal when in close proximity to a marker; and a control unit coupled to the marker detector and to the sensor;

wherein the positional information associated with a marker is provided to the control unit in response to the marker detection signal and the control unit determines at least one coordinate of the sensor based on said positional information and on a predetermined location of the marker detector relative to the sensor.

6. The apparatus as claimed in claim 5, further comprising a movable platform upon which the marker detector and the sensor are located.

7. The apparatus as claimed in claim 5, wherein a marker includes a bar code and the marker detector is a bar code scanner.

8. A system comprising:

A. apparatus for determining at least one current coordinate of a movable sensor, said apparatus intended to be used with a plurality of markers associated with positional information and having
1. a marker detector that transmits a marker detection signal when in close proximity to a marker,
2. a control unit coupled to the marker detector and to the sensor, and
3. a movable platform upon which the marker detector and the sensor are located;

B. wherein the positional information associated with a marker is provided to the control unit in response to the marker detection signal and the control unit determines a coordinate of the sensor based on said positional information and on a predetermined location of the marker detector relative to the sensor;

C. a grid; and

D. wherein the plurality of markers are located at predetermined locations on the grid.

9. A system as claimed in claim 8 wherein an additional marker is placed on the grid and can be read by the sensor to provide additional information such as the grid size and/or the arrangement of the plurality of markers on the grid.

10. A system comprising:
A. apparatus for determining at least one current coordinate of a movable sensor, said apparatus intended to be used with a plurality of markers associated with positional information and having
1. a marker detector that transmits a marker detection signal when in close proximity to a marker,
2. a control unit coupled to the marker detector and to the sensor, and
3. a movable platform upon which the marker detector and the sensor are located;

B. wherein the positional information associated with a marker is provided to the control unit in response to the marker detection signal and the control unit determines at least one coordinate of the sensor based on said positional information and on a predetermined location of the marker detector relative to the sensor;

C. a ribbon; and

D. the plurality of markers being located at intervals along said ribbon.

11. A system as claimed in claim 10 wherein an additional marker is placed on the ribbon and can be read by the sensor to provide additional information such as the ribbon length and/or the arrangement of the plurality of markers on the ribbon.

* * * * *